2,775,053
SIGNAL FOR FISHING RODS

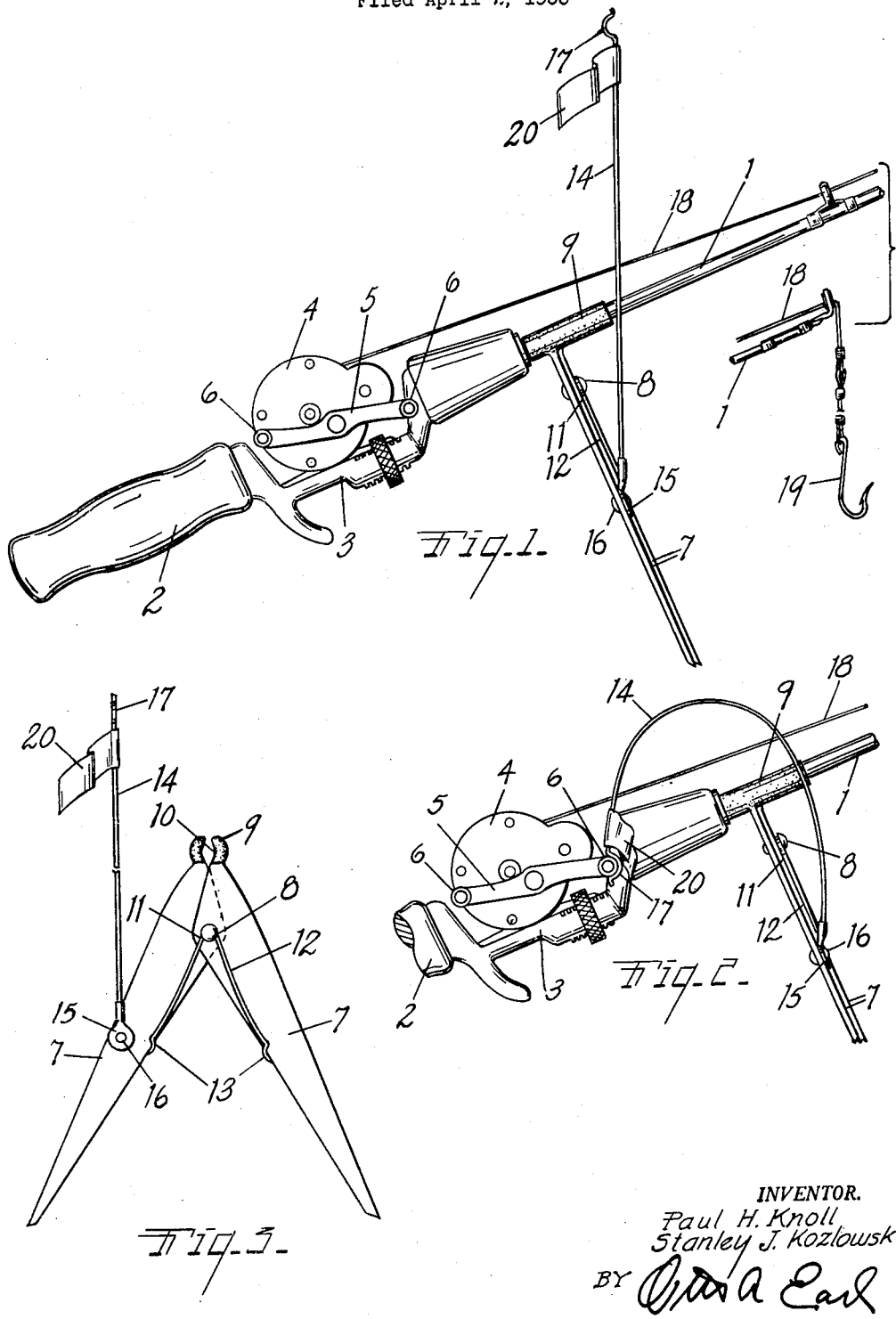

Paul H. Knoll and Stanley J. Kozlowski, Acme, Mich.

Application April 2, 1953, Serial No. 346,446

4 Claims. (Cl. 43—17)

This invention relates to a signal for fishing rods.

The main objects of this invention are:

First, to provide a signal attachment for fishing tackle including a rod, a reel mounted on the rod and provided with a crank and a line operatively associated with the rod which constitutes a support for the rod and means for holding the reel against rotation with the line payed out to the desired extent said means being disengaged from the reel by a pull on the line.

Second, to provide an attachment of the type indicated which may be quickly engaged with the fishing rod and disengaged therefrom and which constitutes an effective support or holder for the rod and at the same time is of relatively little weight so that it does not interfere with the playing or landing of a fish but may be quickly detached if desired.

Third, to provide an attachment of the type described which may be compactly collapsed and is economical to produce and at the same time strong and durable.

Further objects and advantages relating to details and economies of the invention will appear from the description to follow. The invention is defined and pointed out in the claims.

A preferred embodiment of the invention is illustrated in the accompanying drawing, in which:

Fig. 1 is a fragmentary side elevational view of a fishing rod line and reel assembly with our signal attachment operatively associated therewith, the signal arm being shown in its extended or actuated position.

Fig. 2 is a fragmentary side elevational view with the signal in a set position.

Fig. 3 is a front elevational view of the signal attachment removed from the rod.

In the accompanying drawing 1 represents a fishing rod provided with a handle 2 and having a reel set 3 on which the reel 4 is mounted. The reel is provided with a balanced type of crank 5 having finger pieces or grips 6.

The embodiment of our invention illustrated comprises a pair of legs 7 desirably formed as stampings. The legs are pivotally connected at 8 and are provided with transversely disposed elongated rod clamping jaws 9. These jaws have curved opposed faces 10 adapted to grip the rod between them. The jaws are desirably coated with rubber or other gripping material as is indicated.

The bight 11 of the V-shaped spring 12 is engaged with the pivot 8. The arms of the springs having offset portions 13 at their ends engaged with the inner edges of the legs. Thus arranged the spring acts to yieldingly support the legs in a downwardly diverging relation and releasably clamp the jaws 9 upon the rod.

The signal arm 14 is formed of spring wire and has an eye 15 at its inner end fixedly secured to one of the legs as by the rivet 16. The signal arm has an offset keeper portion 17 at its outer end which is engageable with a grip 6 of the reel crank when the signal arm is bent into into a bowed springable tensioned position as shown in Fig. 2. This serves to hold the signal arm in a set position and also to hold the reel against rotation thereby holding the line 18 in its payed out position. The legs support the rod in an inclined position so that it is not necessary for the fisherman to continuously hold the rod. A pull on the hook 19, as by the strike or bit of a fish, rotates the reel and releases the signal arm so that it springs upwardly, as shown in Fig. 1. The signal arm is desirably provided with a pennant like flexible signal 20.

Our attachment may be very quickly applied to or removed from a rod. It is of relatively light weight and does not obstruct the manipulation of the rod and reel in the playing and landing of a fish. However, it may be quickly removed merely by clasping the legs and pressing them toward each other if it is desired to remove it and it may be very quickly replaced. For compact storage one arm of the spring 12 may be disengaged from one of the legs which permits the legs to collapse substantially upon each other. Our signal attachment is adapted for use with rods of widely varying structure.

We have not attempted to illustrate or describe certain modifications or adaptations which we contemplate as it is believed that this disclosure will enable those skilled in the art to embody or adapt our invention as may be desired.

Having thus described our invention, what we claim as new and desire to secure by Letters Patent is:

1. A signal attachment for fishing tackle including a rod, a reel mounted on the rod and provided with a crank, a line operatively associated with the reel and rod, the attachment comprising a pair of pivotally connected rod supporting legs, opposed rod engaging jaws on said legs for detachably connecting the legs to the rod, said jaws being disposed above and in spaced relation to the pivotal connection for the legs, a V-shaped spring having the bight thereof engaged with the pivot for the legs and its arms engaged with the legs to bias the legs to a downwardly diverging jaw closing position, and a resiliently springable signal arm fixedly mounted at one end on one of the legs to be detached as a unit with said legs from said rod, said signal arm when free projecting upwardly from said legs to a position substantially higher than said jaws when the signal arm is in signal position, said arm being springable from said upwardly projecting position to a bowed position in which its outer end is substantially closer the level of the rod engaging jaws than in said upwardly projecting position, and means adjacent the outer end of the arm for releasably engaging the arm with the crank of the reel when the arm is under spring tension and in said bowed position, said arm when released from said bowed position and in an upright position constituting viewable means to indicate the strike of a fish.

2. A signal attachment for fishing tackle including a rod, a reel mounted on the top and provided with a crank, a line operatively associated with the reel and rod, the attachment comprising a pair of pivotally connected rod supporting legs, opposed rod engaging jaws on said legs for detachably connecting the legs to the rod, said jaws being disposed above and in spaced relation to the pivotal connection for the legs, means for holding the legs in a downwardly diverging jaw closing position, and a resiliently springable signal arm fixedly mounted at one end on one of the legs to be detached as a unit with said legs from said rod, said signal arm projecting upwardly from said legs to a position substantially higher than said jaws when the signal arm is in signal position, said arm being springable from said upwardly projecting position to a bowed position in which its outer end is substantially closer the level of the rod engaging jaws than in said upwardly projecting position, and means adjacent the outer end of the arm for releasably engaging the arm with the crank of the reel when the arm is under spring tension and in said bowed position, said arm when released from said bowed position and in an upright position constituting viewable means to indicate the strike of a fish.

3. A signal attachment for fishing tackle including a rod a reel mounted on said rod and provided with a movable part and a line operatively associated with said rod, the attachment comprising a pair of pivotally connected rod supporting legs, opposed rod engaging jaws on said legs for detachably connecting the legs to the rod, said jaws being disposed above and in spaced relation to the pivotal connection for the legs, means for holding the legs in a downwardly diverging jaw closing position, and a resiliently springable signal arm fixedly mounted at one end on one of the legs to be detached as a unit with said legs from said rod, said signal arm projecting upwardly from said leg to a position substantially higher than said jaws when the signal arm is in signal position, said arm being springable from said upwardly projecting position to a bowed position in which its outer end is substantially closer the level of the rod engaging jaws than in said upwardly projecting position, and means adjacent the outer end of the arm for releasably engaging the arm with the movable part of the reel, when the arm is under spring tension and in said bowed position and in an upright position constituting viewable means to indicate the strike of a fish.

4. A signal attachment for fishing tackle including a rod a reel mounted on said rod and provided with a movable part and a line operatively associated with said rod, the attachment comprising pivotally connected rod supporting legs, opposed rod engaging jaws on said legs for detachably connecting said legs to said rod, a spring acting to bias the legs to jaw closing position, and a resiliently springable signal arm mounted on the legs to be detached as a unit with said legs from said rod, said arm projecting upwardly from said leg to a position substantially higher than said jaws when the arm is in signal position, said arm being springable from said upwardly projecting position to a bowed position in which its outer end is substantially closer the level of the rod engaging jaws than in said upwardly projecting position, said arm being releasably engageable under spring tension in said bowed position with the movable part of the reel, said arm when released from said bowed position and in the upright position constituting viewable means to indicate the strike of a fish.

References Cited in the file of this patent
UNITED STATES PATENTS

| | | |
|---|---|---|
| D. 173,260 | Emanatain | Oct. 19, 1954 |
| 271,562 | Worthley | Jan. 30, 1883 |
| 1,128,248 | Hetzel | Feb. 5, 1915 |
| 1,129,210 | Lenk | Feb. 23, 1915 |
| 1,230,467 | Ehrler | June 19, 1917 |
| 1,778,422 | Joyal | Oct. 14, 1930 |
| 2,334,781 | Maines | Nov. 23, 1943 |
| 2,599,099 | Folker | June 3, 1952 |
| 2,624,972 | Burg | Jan. 13, 1953 |

FOREIGN PATENTS

| | | |
|---|---|---|
| 437,314 | Germany | Nov. 15, 1926 |